US008478567B2

(12) United States Patent
Salsbery et al.

(10) Patent No.: US 8,478,567 B2
(45) Date of Patent: Jul. 2, 2013

(54) SYSTEMS AND METHODS FOR MEASURING THE EFFECTIVENESS OF A WORKLOAD PREDICTOR ON A MOBILE DEVICE

(75) Inventors: Brian J. Salsbery, Boulder, CO (US); Norman S. Gargash, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 12/892,159

(22) Filed: Sep. 28, 2010

(65) Prior Publication Data

US 2012/0079357 A1    Mar. 29, 2012

(51) Int. Cl.
*G06F 11/30* (2006.01)
*G06F 1/00* (2006.01)
*G06F 17/11* (2006.01)
*G21C 17/00* (2006.01)

(52) U.S. Cl.
USPC ............ 702/182; 702/183; 713/300; 713/330

(58) Field of Classification Search
USPC .................. 702/182, 183, 186; 713/300, 323, 713/330, 321; 714/1
See application file for complete search history.

(56) References Cited

U.S. PATENT DOCUMENTS

| 6,067,412 | A | 5/2000 | Blake et al. |
| 7,131,015 | B2 | 10/2006 | Flautner et al. |
| 7,500,204 | B2 | 3/2009 | Pineda De Gyvez et al. |
| 7,685,446 | B2 | 3/2010 | Hong et al. |
| 2007/0168055 | A1 | 7/2007 | Hsu et al. |
| 2008/0262822 | A1 | 10/2008 | Hardwick et al. |
| 2009/0100276 | A1* | 4/2009 | Rozen et al. .................. 713/300 |
| 2009/0157378 | A1 | 6/2009 | Boldyrev et al. |
| 2009/0210740 | A1 | 8/2009 | Huang et al. |
| 2009/0217099 | A1 | 8/2009 | Kato |
| 2011/0252248 | A1* | 10/2011 | Cameron et al. .............. 713/300 |

OTHER PUBLICATIONS

International Search Report and Written Opinion—PCT/US2011/045293—ISA/EPO—Oct. 7, 2011 (101763WO).
Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

* cited by examiner

*Primary Examiner* — Marc Armand
*Assistant Examiner* — Ricky Ngon
(74) *Attorney, Agent, or Firm* — Nicholas A. Cole

(57) ABSTRACT

Systems and methods for measuring the effectiveness of a workload predictor operative on a mobile device are disclosed. A load manager includes a workload predictor, a sensor, an error generator and a controller. The workload predictor generates an estimate of the workload on a processor core operative on the mobile device. The sensor generates a measure of the actual workload on the processor core. The error generator receives the estimate of the workload and the measure of the actual workload on the processor core and generates an error signal. The controller receives the error signal and determines the effectiveness of the workload predictor as a function of the error signal over time.

16 Claims, 9 Drawing Sheets

SYSTEMS AND METHODS FOR MEASURING THE EFFECTIVENESS OF A WORKLOAD PREDICTOR ON A MOBILE DEVICE

DESCRIPTION OF THE RELATED ART

Technological advances in wireless communication protocols, energy storage density, processor performance and efficiency, and an increase in the density of cellular transmitters enabled the introduction of wireless digital networks in the 1990s. As use of second generation mobile devices became more widespread it became clear that the demand for data services which include access to the Internet was growing. The introduction of packet-switching rather than circuit-switching for data transmission with third generation wireless communication systems enabled the increases in data transmission rates required to deliver streaming media to a mobile device.

Today's data network capable mobile devices include high-performance processors to provide a plethora of applications to the end user. However, the demand for performance results in a corresponding increase in power consumption. The power dissipation in modern processors is rapidly increasing as both clock frequency and the number of transistors required for a given implementation increase. Unfortunately, battery technology has not kept pace with the energy requirements of these data network capable wireless devices, which leads to a design trade-off between application performance and battery life. Even when it is determined that battery life can be sacrificed for full performance, heat management may become problematic for both the battery and the electronic circuits within the often hand-sized housings.

The demand for processors that provide high performance and low power consumption has led to the use of dynamic voltage and frequency scaling (DVFS) in processor designs. DVFS enables trade-offs between power consumption and performance. Processors designed to take advantage of DVFS allow the clock frequency of the processor to be adjusted with a corresponding adjustment in voltage. Reducing clock frequency alone is not useful, since any power savings is offset by an increase in execution time, resulting in no net reduction in the total energy consumed. However, a reduction in operating voltage results in a proportional savings in power consumed.

The central issue for DVFS enabled processors is how to control the balance between performance and power savings. A conventional DVFS control algorithm uses a measure of idle time to identify a modified performance level that permits a projected workload to be stretched in time to a deadline. That is, idle time is reduced by operating the processor at a lower voltage and slower clock frequency. While this approach may be appropriate for a continuous and known workload, many mobile device applications are interactive and/or place irregular or unpredictable demands on the processor. Thus, it is apparent that no one algorithm is optimal for all mobile device applications, application combinations and uses.

SUMMARY OF THE DISCLOSURE

A method for measuring the effectiveness of a workload predictor operative on a mobile device includes the steps of generating a real-time measure of the actual workload on the mobile device, using a workload predictor to generate an estimate of the workload on the mobile device, comparing the real-time measure of the workload to the estimate of the workload to generate an error signal, recording the error signal over time and generating a function of the error signal as a measure of the effectiveness of the workload predictor.

In an alternative embodiment of the method for measuring the effectiveness of a workload predictor, the method further includes the step of applying the error signal to a controller that adjusts at least one parameter in response to the error signal.

In some example embodiments, the method for measuring the effectiveness of a workload predictor is implemented on one of a cellular telephone, a pager, a personal digital assistant, a reader, a satellite phone, a navigation device, or a computing device with a wireless connection.

In some other example embodiments of the method for measuring the effectiveness of a workload predictor, the method further includes calculating an integral of the square of the error signal over a select period.

In still another alternative embodiment of the method for measuring the effectiveness of a workload predictor, the method further comprises the step of associating the error signal with a combination of an active performance scaling algorithm and at least one parameter.

In another alternative embodiment of the method for measuring the effectiveness of a workload predictor, the method further includes the steps of using a measure of cross-correlation of the error signal to determine if a present operating state of the mobile device is similar to a known use case and applying an appropriate combination of a performance scaling algorithm and one or more parameters when the mobile device is so configured.

According to another aspect, a load manager for execution on a mobile device is disclosed. The load manager includes a workload predictor, at least one sensor, an error generator and a controller. The workload predictor generates an estimate of the workload on a processor core operative on the mobile device. The sensor or sensors generate one or more measures of the actual workload on the processor core operative on the mobile device. The error generator receives the estimate of the workload and the measure of the actual workload and generates an error signal. The controller receives the error signal and adjusts operation of the processor core.

In an example embodiment of the load manager, the workload predictor is responsive to a performance scaling algorithm.

In another example embodiment of the load manager, the magnitude of the square of the error signal is used to determine the accuracy of the workload predictor to predict the actual workload.

In an alternative embodiment of the load manager, a time sequence store is included to record the error signal over time. This alternative embodiment of the load manager can further include one or more cross-correlators coupled to the time sequence store. The one or more cross-correlators generate respective measures of the similarity of the real-time error signal to an error signal associated with an identified use of the mobile device.

Furthermore, a system for managing a workload on a mobile device includes mechanisms for measuring an actual workload of a processor core operative on the mobile device, mechanisms for generating an estimate of the workload of the processor core operative on the mobile device, mechanisms for generating an error signal over time, mechanisms for storing the error signal over time, mechanisms for associating a stored error signal over time with a present state of use of the mobile device and mechanisms for selectively adjusting the mobile device in response to the stored error signal over time.

In an embodiment of the system for managing a workload on a mobile device, the mechanisms for generating an estimate of the workload of a processor core operative on the mobile device include a workload predictor.

In another embodiment of the system for managing a workload on a mobile device, the mechanisms for selectively adjusting the mobile device in response to the error signal include a cross-correlator and a detector.

Moreover, in still another alternative embodiment, a computer program product is disclosed that includes executable instructions that when executed implement a method for identifying the effectiveness of a workload predictor operative on a mobile device. The computer program product includes logic configured to generate a real-time measure of the actual workload on a mobile device, logic configured to generate an estimate of the workload on the mobile device, logic configured to compare the real-time measure of the workload to the estimate of the workload to generate an error signal, logic configured to record the error signal over time, logic configured to calculate a function of the error signal and logic configured to determine the effectiveness of the workload predictor in response to the function of the error signal.

In an alternative embodiment of the computer program product, the computer program product further includes logic configured to adjust at least one parameter in response to the error signal.

In another alternative embodiment of the computer program product, the computer program product further includes logic configured to associate the error signal with a combination of a performance scaling algorithm and at least one parameter.

In still another alternative embodiment of the computer program product, the computer program product further includes logic configured to generate a measure of cross-correlation to determine if a present operating state of the mobile device is similar to a known use case for which an appropriate combination of a performance scaling algorithm and one or more parameters has been identified to accomplish a desired goal.

In still another alternative embodiment of the computer program product, the computer program product further includes logic configured to store an indication of the most similar combination of a performance scaling algorithm and one or more parameters and logic configured to apply the combination when the mobile device is so configured.

BRIEF DESCRIPTION OF THE DRAWINGS

The systems and methods for measuring the effectiveness of a workload predictor operative on a mobile device can be better understood with reference to the following figures. The components within the figures are not necessarily to scale, emphasis instead being placed upon clearly illustrating the principles of measuring a workload, estimating a workload with a workload predictor, generating an error signal as a function of the actual workload and the estimate of the workload and using a function of the error signal as a measure of the effectiveness of the workload predictor. Moreover, in the figures, like reference numerals designate corresponding parts throughout the different views.

DETAILED DESCRIPTION

Figure 1:
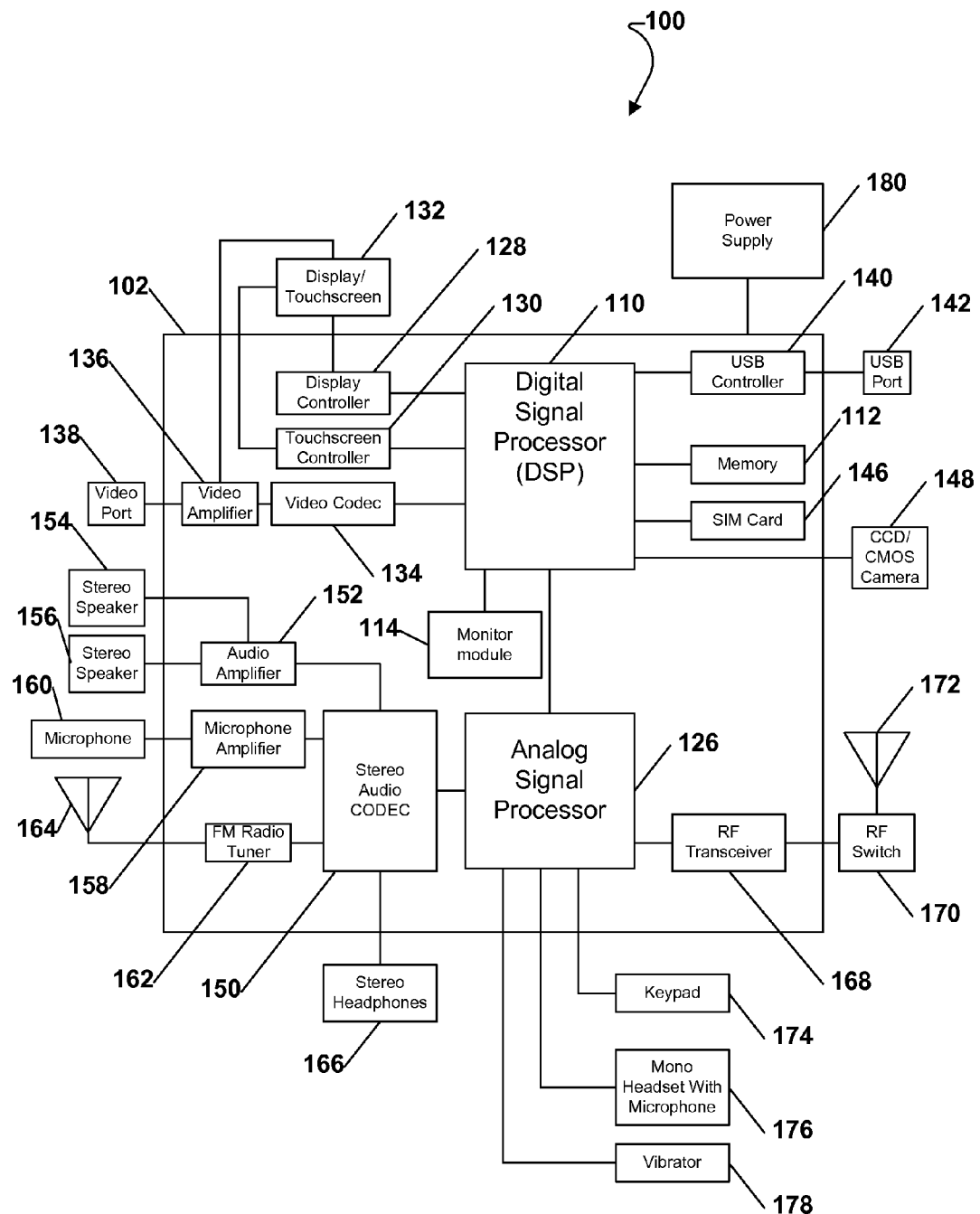
FIG. 1 is a schematic diagram illustrating an embodiment of a mobile device.

The word "exemplary" is used herein to mean "serving as an example, instance, or illustration." Any aspect described herein as "exemplary" is not necessarily to be construed as preferred or advantageous over other aspects.

In this description, the term "application" may include files having executable content, such as: object code, scripts, byte code, markup language files, and patches. In addition, an "application" as referred to herein, may also interact with files that are not executable in nature, such as documents that may need to be opened or other data files that need to be accessed.

In this description, the term "mobile device" is used to describe any device operating on a limited capacity power supply, such as a battery. Although battery operated mobile devices have been in use for decades, technological advances in rechargeable batteries coupled with the advent of third and fourth generation ("3G and 4G") wireless technology, have enabled numerous mobile devices with multiple capabilities. Therefore, a mobile device could be a cellular telephone, a satellite telephone, a pager, a PDA, a smartphone, a navigation device, a smartbook or reader, a media player, a combination of the aforementioned devices, a laptop computer with a wireless connection, among others.

The introduction of multiple-core processors and dedicated hardware resources for implementing various functions on a mobile device and a continuing desire for improvement in battery life while ensuring a satisfactory end user experience has further complicated the task of dynamically adjusting a mobile device to meet these often conflicting goals.

As explained above, a conventional DVFS control algorithm uses a measure of idle time to identify a modified performance level that permits a projected workload to be stretched in time to a deadline. That is, idle time is reduced by operating the processor at a lower voltage and slower clock frequency. While this approach may be appropriate for a continuous and known workload, many mobile device applications are interactive and/or place irregular or unpredictable demands on the processor. Moreover, the number of different mobile devices available, the various communication protocols or standards used to communicate with the devices, the different types of applications available, the different ways that the devices are used, etc., make it clear that no single approach or solution can be adjusted or optimized for all possible operational combinations. Thus, it is apparent that no one algorithm is optimal or appropriate for all mobile device applications, application combinations and uses.

In response, an improved mobile device and methods for determining the effectiveness of a workload predictor are disclosed. The output of a workload predictor can be used to evaluate the performance of the workload predictor. When data concerning various uses of the mobile device is available, the output of a workload predictor can be used to identify a real-time use of the mobile device. Furthermore, the output of a workload detector can be forwarded to a controller to adjust the mobile device in multiple ways. For example, the output of a workload predictor can be applied to a controller that selects a set of operating parameters to be applied to a select algorithm, such as a performance scaling algorithm operative on the mobile device. In another example, an error signal generated from the output of the workload predictor is applied to a cross-correlator that provides a measure of the similarity of the real-time error signal to a previously stored error signal. When the cross-correlator indicates that the error signals match to some level of certainty and the previously stored error signal is associated with a known use case on the mobile device, a controller can select a previously optimized combination of a performance scaling algorithm and a parameter set to manage the workload across the multiple processing cores available on the mobile device.

The systems and methods for measuring the effectiveness of a workload predictor operative on a mobile device are generally implemented via a combination of software or firmware and hardware. The software and firmware can be stored in a non-volatile memory element coupled to one or more processors operable on the mobile device. The software stored in the non-volatile memory element is communicated to and executed by a suitable instruction execution system (microprocessor). A hardware implementation on a mobile device can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

Referring to FIG. 1, this figure is a diagram of an exemplary, non-limiting aspect of a mobile device 100 in the form of a wireless telephone. As shown, the mobile device 100 includes an on-chip system 102 that includes a digital signal processor 110 and an analog signal processor 126 that are coupled together. As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 further indicates that a video encoder 134, e.g., a phase-alternating line ("PAL") encoder, a sequential couleur avec memoire ("SECAM") encoder, a national television system(s) committee ("NTSC") encoder or any other video encoder, is coupled to the digital signal processor 110. Further, a video amplifier 136 is coupled to the video encoder 134 and the touchscreen display 132. A video port 138 is coupled to the video amplifier 136. As depicted in FIG. 1, a universal serial bus ("USB") controller 140 is coupled to the digital signal processor 110. Also, a USB port 142 is coupled to the USB controller 140. A memory 112 and a subscriber identity module (SIM) card 146 may also be coupled to the digital signal processor 110. Further, as shown in FIG. 1, a digital camera 148 may be coupled to the digital signal processor 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

FIG. 1 also shows that the mobile device 100 may include a monitor module 114. The monitor module 114 communicates with multiple operational sensors distributed throughout the on-chip system 102 and with the digital signal processor 110 of the mobile device 100. As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 102. However, it should be understood that the monitor module 114 may also receive one or more indications or signals from one or more of these external devices by way of the analog signal processor 126 and the digital signal processor 110 to aid in the real time management of the resources operable on the mobile device 100.

In a particular aspect, one or more of the method steps described herein may implemented by executable instructions and parameters stored in the memory 112. These instructions may be executed by the digital signal processor 110, the analog signal processor 126, or another processor, to perform the methods described herein. Further, the processors, 110, 126, the memory 112, the instructions stored therein, or a combination thereof may serve as a means for performing one or more of the method steps described herein.

Figure 2:
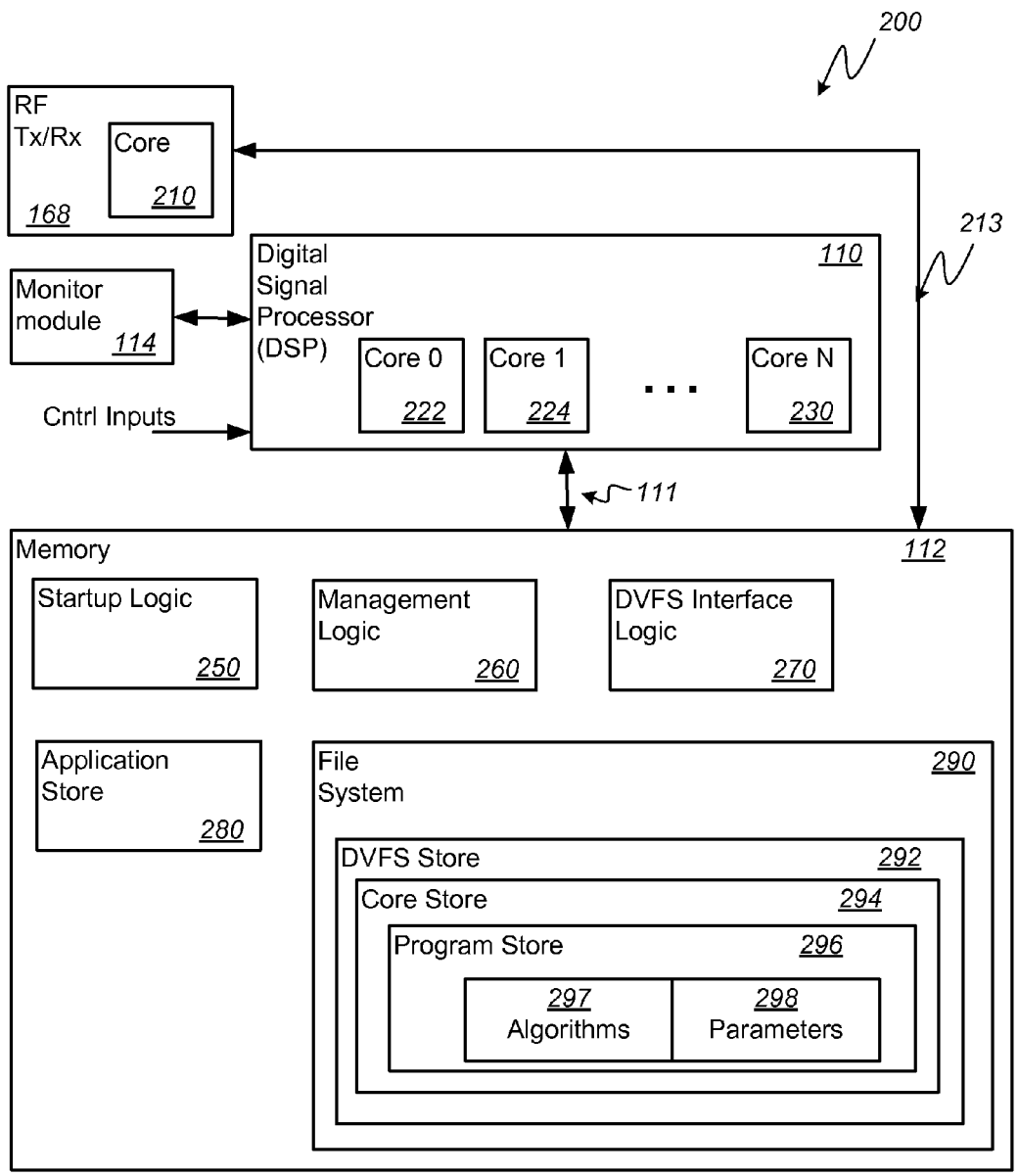
FIG. 2 is a schematic diagram illustrating features of the mobile device of FIG. 1.

FIG. 2 is a schematic diagram illustrating features of the mobile device 100 of FIG. 1. As indicated in FIG. 2, the digital signal processor 110 is coupled to the memory 112 via a bus 111. The digital signal processor 110 is a multiple-core processor having N core processors. That is, the digital signal processor 110 includes a first core 222, a second core 224, and a $N^{th}$ core 230. As is known, each of the first core 222, the second core 224 and the $N^{th}$ core 230 are available for supporting a dedicated application or program. Alternatively, one or more applications or programs can be distributed for processing across two or more of the available cores.

The first core 222, the second core 224 through to the $N^{th}$ core 230 can be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213.

Each of the bus 111 and the bus 213 may include multiple communication paths via one or more wired or wireless connections, as is known in the art. The bus 111 and the bus 213 may have additional elements, which are omitted for simplicity, such as controllers, buffers (caches), drivers, repeaters, and receivers, to enable communications. Further, the bus 111 and the bus 213 may include address, control, and/or data connections to enable appropriate communications among the aforementioned components.

When the logic used by the mobile device 100 is implemented in software, as is shown in FIG. 2, it should be noted that one or more of startup logic 250, management logic 260, DVFS interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the DVFS interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

The startup logic 250 includes one or more executable instructions for selectively identifying, loading, and executing a select program for managing or controlling the performance of one or more of the available cores such as the first core 222, the second core 224 through to the $N^{th}$ core 230. A select program can be found in the program store 296 of the embedded file system 290 and is defined by a specific combination of a performance scaling algorithm 297 and a set of parameters 298. The select program, when executed by one or more of the core processors in the digital signal processor and the core 210 in the RF transceiver 168, may operate in accordance with one or more signals provided by the monitor module 114 to scale the performance of the respective processor core. In this regard, the monitor module 114 may provide one or more indicators of events, processes, applications, resource status conditions, elapsed time, temperature, etc.

The management logic 260 includes one or more executable instructions for terminating an operative performance scaling program on one or more of the respective processor cores, as well as selectively identifying, loading, and executing a more suitable replacement program for managing or controlling the performance of one or more of the available cores. The management logic 260 is arranged to perform these functions at run time or while the mobile device is powered and in use by an operator of the device. A replacement program can be found in the program store 296 of the embedded file system 290 and is defined by a specific combination of a performance scaling algorithm 297 and a set of parameters 298. As illustrated in FIG. 2, the program store 296 can be hierarchically arranged within a core store 294 and a DVFS store 292. The replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc.

The DVFS interface logic or interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the mobile device 100 to suspend all performance scaling in the RF transceiver 168 when the received signal power falls below an identified threshold. By way of further example, the inputs may include a change to the management logic 260 that instructs the mobile device 100 to apply a desired program when the video codec 134 is active.

The interface logic 270 enables a manufacturer to controllably configure and adjust an end user's experience under defined operating conditions on the mobile device 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the mobile device 100 to search, locate, modify or replace the startup logic 250, the management logic 260, applications in the application store 280 and information in the embedded file system 290. The operator may use the resulting interface to make changes that will be implemented upon the next startup of the mobile device 100. Alternatively, the operator may use the resulting interface to make changes that are implemented during run time.

Figure 3A:
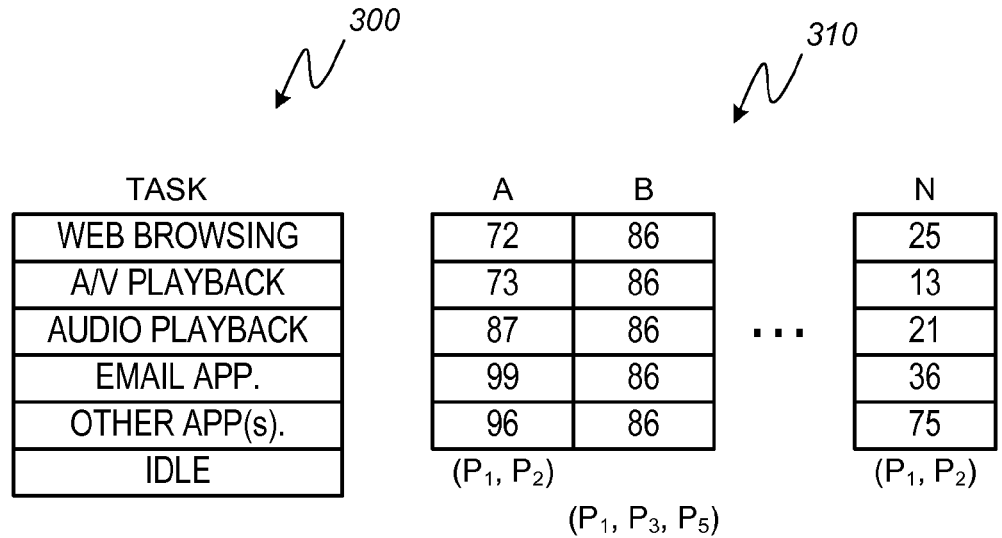
FIGS. 3A and 3B include schematic diagrams illustrating embodiments of use cases.
Figure 3B:
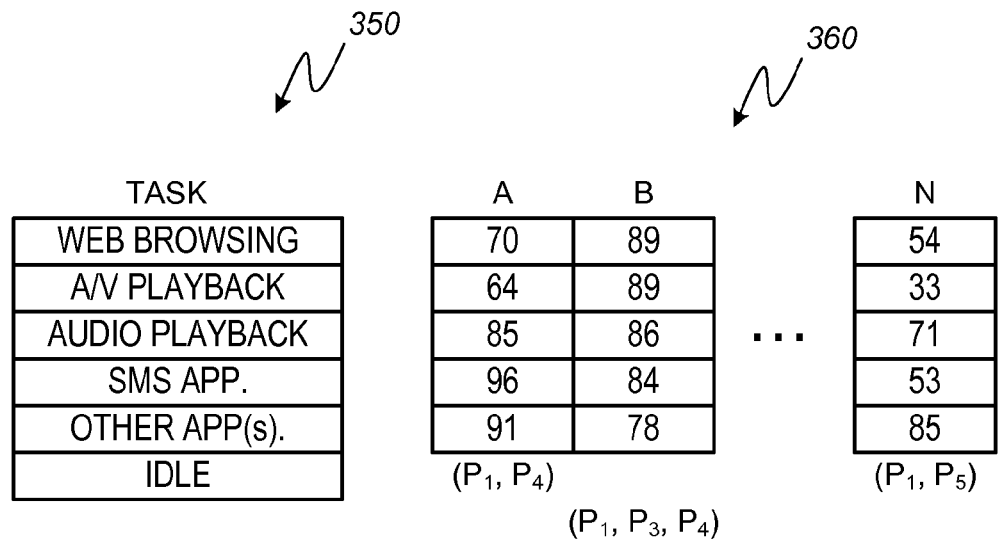

FIGS. 3A and 3B include schematic diagrams illustrating embodiments of use cases. A first example use case is illustrated in the table 300 of FIG. 3A. The use case includes a set of tasks that are capable of being performed on the mobile device 100. The tasks include web browsing (i.e., executing a browser application while the mobile device 100 is in communication range of transmitter that is coupled to the Internet), audio/video playback, audio playback, running an email application, and running one or more other applications. A second example use case is illustrated in the table 350 of FIG. 3B. This second use case includes a short messaging service (SMS) application in place of the email application of the first use case.

It is possible that one or more use cases may present an identifiable workload on the processing resources of the mobile device 100. If the workload on the mobile device 100 can be identified, a suitably configured workload manager can be applied to adjust operating conditions on the mobile device 100 as may be desired to ensure performance, conserve battery power, or apply specific performance scaling algorithms and corresponding parameters designed to achieve a desired tradeoff between performance and power consumption.

A measure of the effectiveness or accuracy of a workload predictor provides an input to a control system such as a load manager that can be used to identify a workload on the mobile device 100. When enabled, the load manager operates in real time to identify a present load on the mobile device 100 and under certain circumstances reacts to an identified workload by adjusting one or more operating parameters on the mobile device 100. For mobile devices 100 that include multiple performance scaling algorithms that are known to achieve a desired balance between operator experience and power consumption, the identification of an identified workload can be used to select and apply an appropriate combination of a select performance scaling algorithm and one or more parameters on the mobile device 100.

Figure 4:
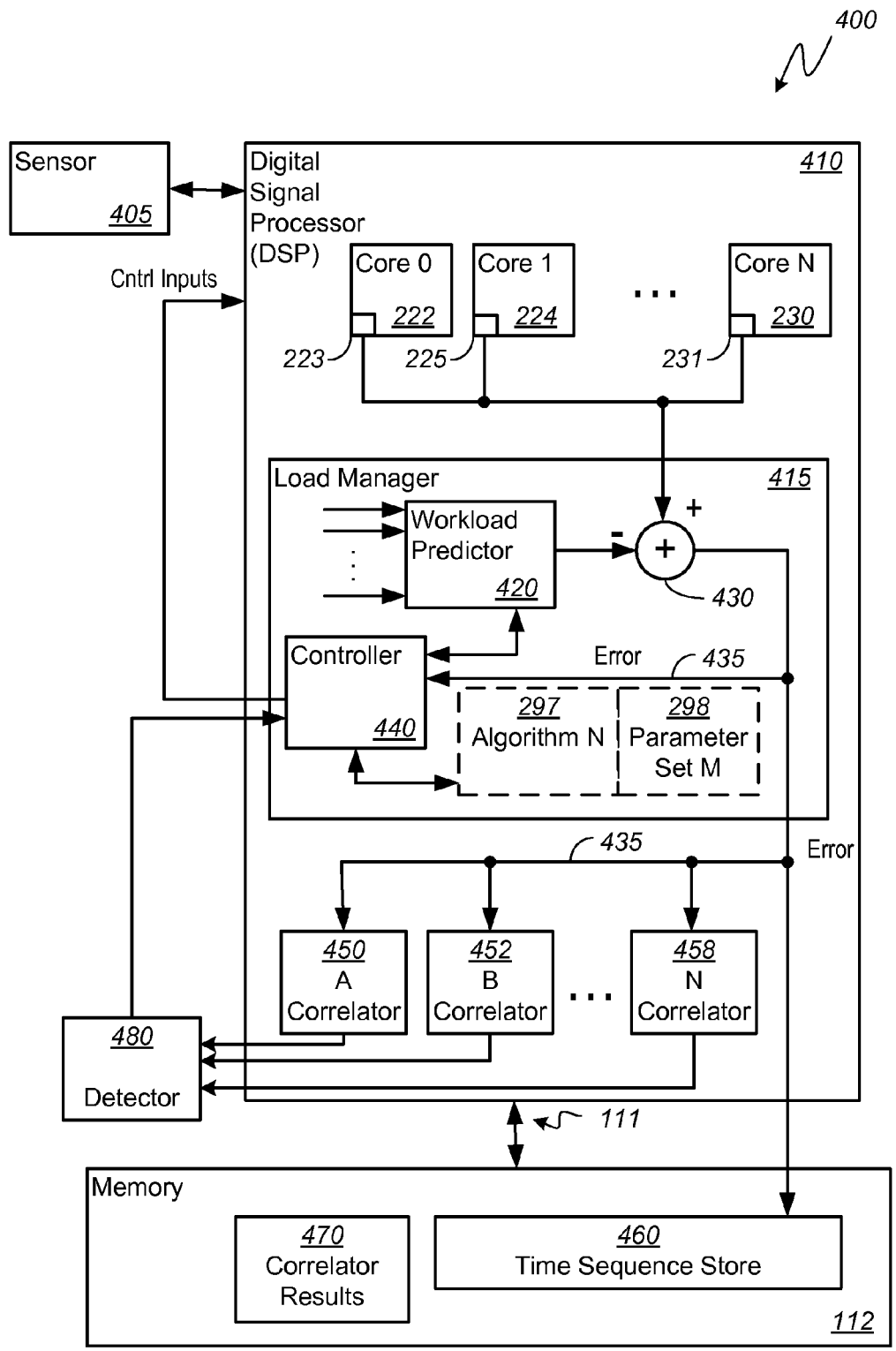
FIG. 4 is a schematic diagram illustrating an embodiment of a system for managing a workload that can be implemented by the mobile device of FIG. 1.

FIG. 4 is a schematic diagram illustrating an embodiment of a system 400 for measuring the effectiveness of a workload predictor 420 associated with a load manager 415 for a present use of the mobile device 100 of FIG. 1. The system 400 provides a real-time quantitative analysis of the effectiveness of the workload predictor to accurately identify the workload on the processing cores of the DSP 410 operative on the mobile device 100.

As indicated in FIG. 4, the system includes a digital signal processor 410 that is coupled to a sensor 405 to receive one or more indications of a present operational state on the mobile device 100. In addition, to being coupled to the sensor 405, the digital signal processor 410 is coupled to a memory element 112 via a bus 111 and to a detector 480. As indicated above, the memory element 112 can be configured with multiple programs or sets of executable statements (i.e., logic) for performing desired functions. Such functions may include storing an error signal over time for comparison via one or more cross-correlators to quantify the similarity of the real-time error signal to one or more previously recorded error signals for respective identified use cases.

As suggested above, the load manager 415 can be arranged to adjust one or more operating parameters as may be desired on the mobile device 100 in response to the error signal. As also suggested above, if a previously recorded error signal is associated with an identified use case, and if the real-time error signal approximates the previously recorded error signal, the load manager 415 can apply a previously optimized set of parameters and/or a combination of a performance scaling algorithm and a set of parameters on the mobile device 100.

The sensor 405 or a set of sensors (not shown) can provide a host of indications of how the mobile device 100 is presently configured. Such indications can be provided by a physical device configured to provide a measure of a physical parameter such as a voltage, a current, a temperature, etc., or they may represent the contents of one or more registers or other storage locations, such as in the case of a software stack. Moreover, the sensor 405 may provide one or more additional indicators based on the operating state of various resources on the mobile device 100. Although the sensor 405 is illustrated as being external to the digital signal processor 410, it should be understood that the digital signal processor 410 may include additional sensors such as sensor 223, which measures one or more conditions on the processor core 222, sensor 225, which measures one or more conditions on processor core 224 and sensor 231, which measures one or more conditions of the processor core 230. As shown in FIG. 4, the sensor 223, the sensor 225 and the sensor 231 provide actual measures indicative of the actual workload on the mobile device 100 to the load manager 415. One or more of the sensor 405, sensor 223, sensor 225, and sensor 231 may be formed external to the digital signal processor 410 or integrated within the digital signal processor 410.

However, the sensor 405 or additional sensors are arranged, configured or distributed about the mobile device 100, the digital signal processor 410 is a multiple-core processor having N core processors. That is, the digital signal processor 410 includes a first core 222, a second core 224, and a $N^{th}$ core 230. As is known, each of the first core 222, the second core 224 and the $N^{th}$ core 230 are available for supporting a dedicated application or program. Alternatively, one or more applications or programs can be distributed for processing across two or more of the available cores.

The first core 222, the second core 224 through to the $N^{th}$ core 230 can be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

A load manager 415 includes a workload predictor 420, an error generator 430 and a controller 440. In optional embodiments, the load manager 415 may also include a set of performance scaling algorithms and sets of parameters for applying a DVFS scheme across one or more of the cores. The workload predictor 420 receives one or more inputs and generates an indication of a predicted workload at one or more outputs. A first output couples the indication of a predicted workload (i.e., a time varying signal) to the controller 440. A second output couples the signal representing the predicted workload to a negative input of the error generator 430. The error generator 430 receives an actual measure of the workload on the mobile device 100 from the sensor 223, the sensor 225, or the sensor 231 at a positive input of the error generator 430. In response, the error generator 430 communicates the error signal (i.e., the difference of the measured or actual workload and the predicted workload) on connection 435 to the controller 440, to one or more cross-correlators (e.g., the cross-correlator 450, the cross-correlator 452 and the cross-correlator 458) and to a time sequence store 460 in the memory 112.

In alternative embodiments, more than one workload predictor could be implemented with a load manager. For example, it is possible that a first workload predictor would predict use cases X and Y well, but not use case Z. When use case Z is associated with or otherwise defines an important use case for the mobile device 100, a second workload predictor different from the first workload predictor and capable of accurately predicting use case Z will be useful to the load manager.

The controller 440 includes logic that generates one or more control inputs for selectively adjusting one or more of the parameters being applied to the core 222, the core 224 and the core 230. The controller 440 may further include logic that generates one or more control inputs for selectively adjusting a parameter set to be applied with a select DCVS algorithm 297 that is being applied to adjust the frequency and voltage of a select core processor. As will be explained below, the logic may be responsive to inputs from the sensor 405, the sensor 223, the sensor 225, the sensor 231, the error signal on connection 435 or a function thereof and/or the results from the N cross-correlators. The sensor 405, the sensor 223, the sensor 225, the sensor 231 and perhaps additional sensors may provide software generated measures such as processor idle or may provide an indication of a direct or indirect measure of a voltage, current, temperature, etc.

Each of the N cross-correlators may include or will have access to a time sequence of error values generated by operation of the mobile device 100 in a known use state. In some embodiments, an optimized combination of a performance scaling algorithm and parameter set previously identified as the most efficient at saving power while maintaining a desired level of performance on the mobile device 100 for an identified use case is associated with the known use state. The memory 112 includes a time sequence store 460 for retaining the error sequences for each of the available combinations of performance scaling algorithms and parameter sets on the mobile device 100. Alternatively, each of the N cross-correlators may have an internal buffer for storing a respective error sequence. In alternative embodiments (not shown), a neural network could replace the N cross-correlators. The neural network would identify the present use case using a technique other cross-correlation.

Each of the N cross-correlators generates a respective measure of how successful the error history generated by the workload predictor is to a known signal. The respective outputs of the cross-correlators is communicated to a detector 480, which is configured to select or identify the cross-correlator that best matches the real-time error signal. For example, the detector 480 may include circuit elements and/or logic that identify the cross-correlator with a normalized output that is closest to one when the output varies between −1 and 1. Cross correlation is a standard method of estimating the degree to which two series are correlated. Systems and methods for performing a cross-correlation analysis of two time-varying signals are well known and need not be detailed herein for an understanding of the present invention.

A comparison of the results from the N cross-correlators identifies which previously known use case is a best fit match for the present operating state or use of the mobile device 100. Thus, the mobile device 100 can be presently operating in an unknown configuration or use case and still select and apply an effective combination of a performance scaling algorithm and parameter set to save power while still maintaining a desired level of performance. The detector 480 communicates a control signal to the controller 440 in the load manager 415. The controller 440 forwards control inputs to the various cores to manage operation of these resources. In addition, the controller 440 is configured to select and apply a performance scaling algorithm 297 and a suitable parameter set 298, if necessary, to adjust operation of the processing resources on the mobile device 100.

Figure 5:
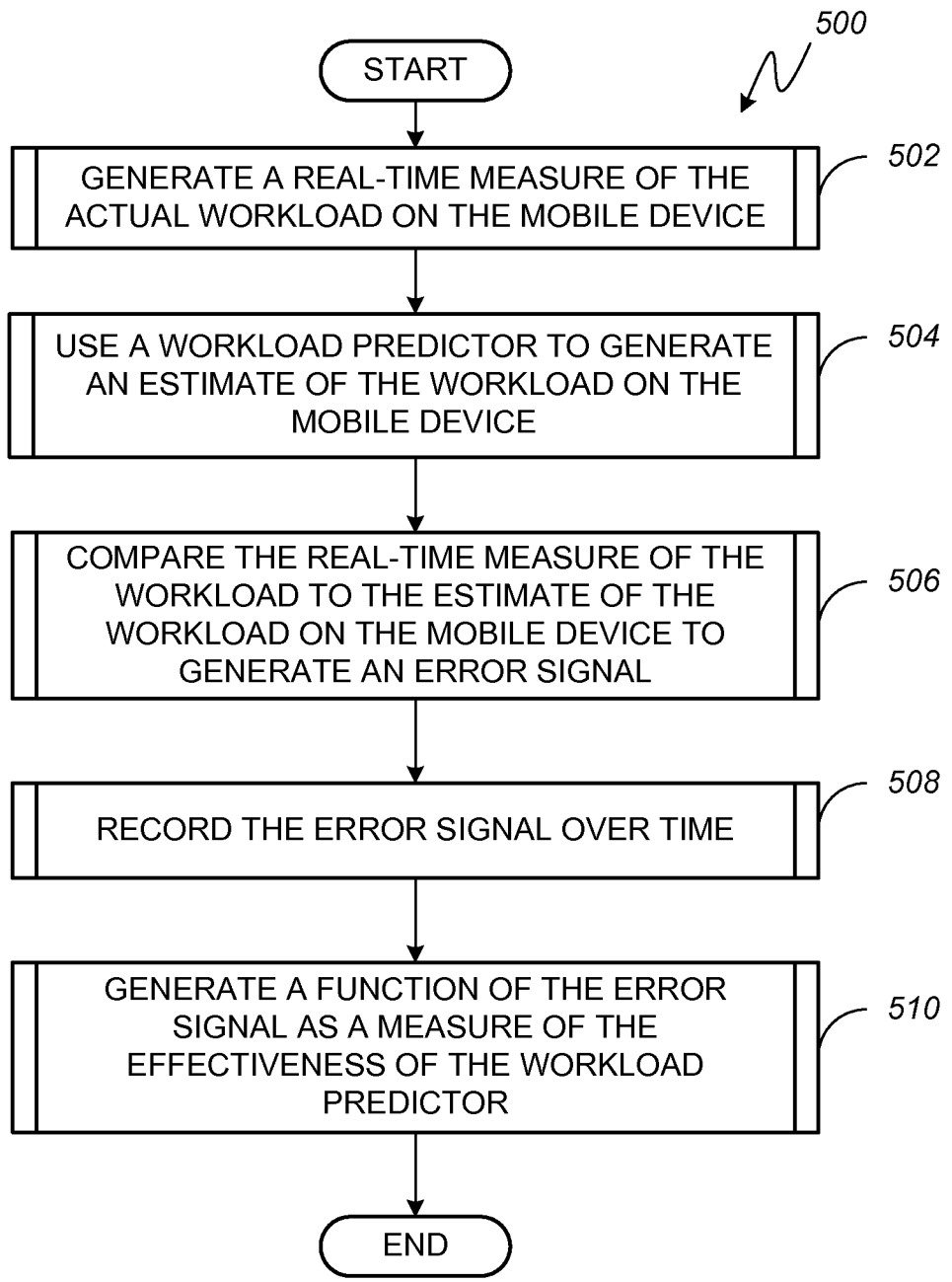
FIG. 5 is a flow diagram illustrating an embodiment of a method for determining the effectiveness of a workload predictor operative on the mobile device of FIG. 4.

FIG. 5 is a flow diagram illustrating an embodiment of a method 500 for determining the effectiveness of a workload predictor operative on the mobile device of FIG. 4. Generally the effectiveness or accuracy of the workload predictor for a use case is determined as the sum of square of the error signal throughout the use case or for a desired period of time. The error term is squared as the error signal at any particular instant in time may be negative or positive.

The method 500 begins with block 502 where a real-time measure of the workload on the mobile device 100 is generated. Such a measure may include a number of instructions processed per second, instructions processed per watt, or any number of alternative performance measures. In block 504, the mobile device 100 uses a workload predictor to generate an estimate of the workload on the mobile device 100. Thereafter, in block 506, the mobile device 100 compares the real-time measure of the workload with the estimate of the workload to generate an error signal. As indicated in block 508, the error signal is recorded over time. Thereafter, in block 510, a function of the error signal is generated as a measure of the effectiveness or accuracy of the workload predictor.

In some embodiments, the sum of the square of the error is calculated and forwarded as a measure of the effectiveness of the workload predictor. Accordingly, the smaller the value of the sum of the square of the error, the more accurate the workload predictor is at predicting the measured workload on the mobile device 100 for the present use case.

Figure 6:
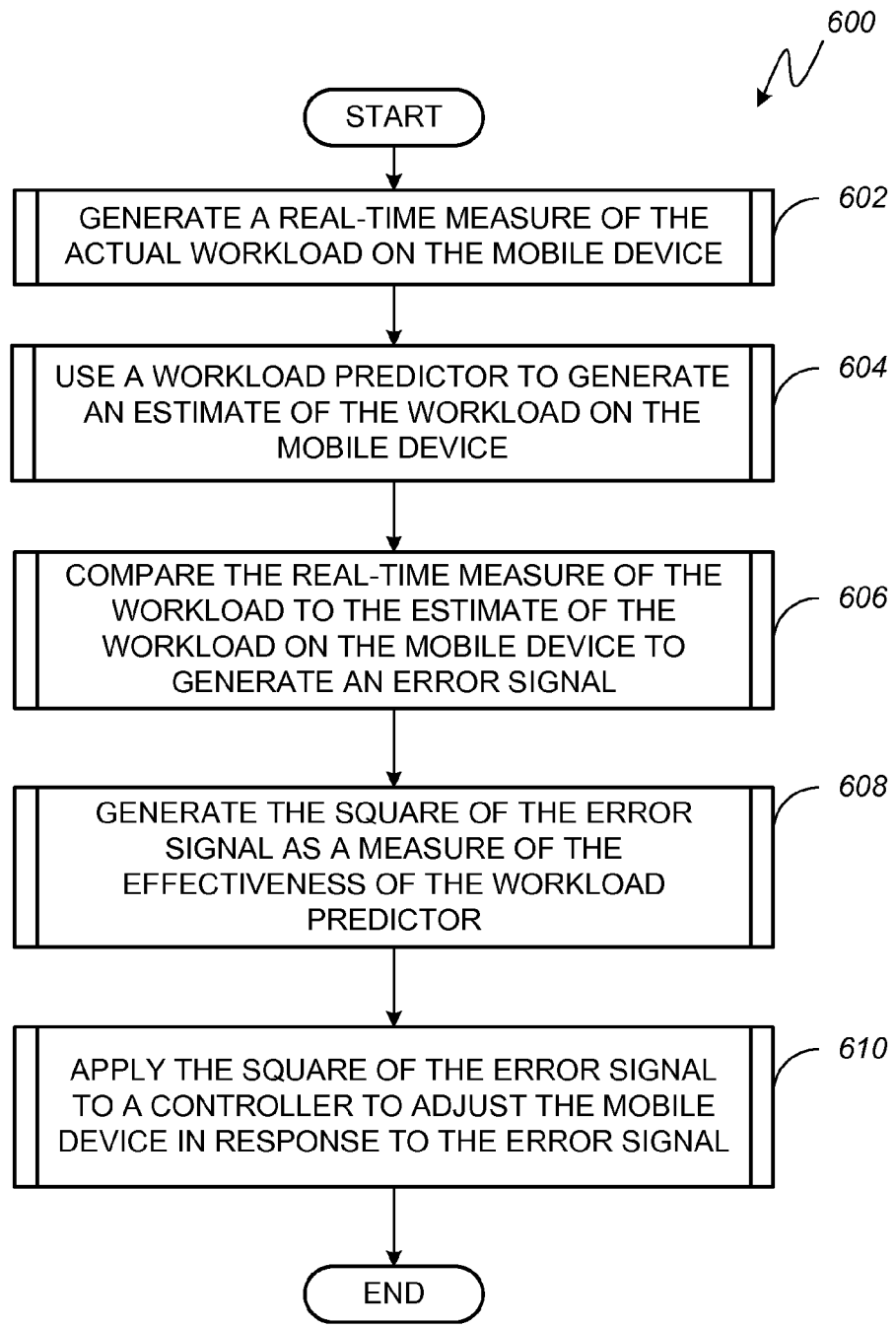
FIG. 6 is a flow diagram illustrating an alternative embodiment of a method that can be performed on the mobile device of FIG. 4.

FIG. 6 is a flow diagram illustrating an alternative embodiment of a method 600 that can be performed on the mobile device of FIG. 4. The method 600 begins with block 602 where a real-time measure of the actual workload on the mobile device 100 is generated. Such a measure may include a number of instructions processed per second, instructions processed per watt of power consumed, or any number of alternative performance measures. In block 604, the mobile device 100 uses a workload predictor to generate an estimate of the workload on the mobile device 100. Thereafter, in block 606, the mobile device 100 compares the real-time measure of the workload with the estimate of the workload to generate an error signal. In the embodiment illustrated in FIG. 4, the load manager 415 calculates the difference of the actual or measured workload and the predicted workload. As indicated in block 608, the square of the error signal is calculated. Thereafter, in block 610, the square of the error term is forwarded to a controller that adjusts the mobile device 100 in response to the magnitude of the square of the error signal. In some embodiments (not shown) the square of the error signal may be low-pass filtered or otherwise processed by the controller to maintain stability in the load manager.

Figure 7:
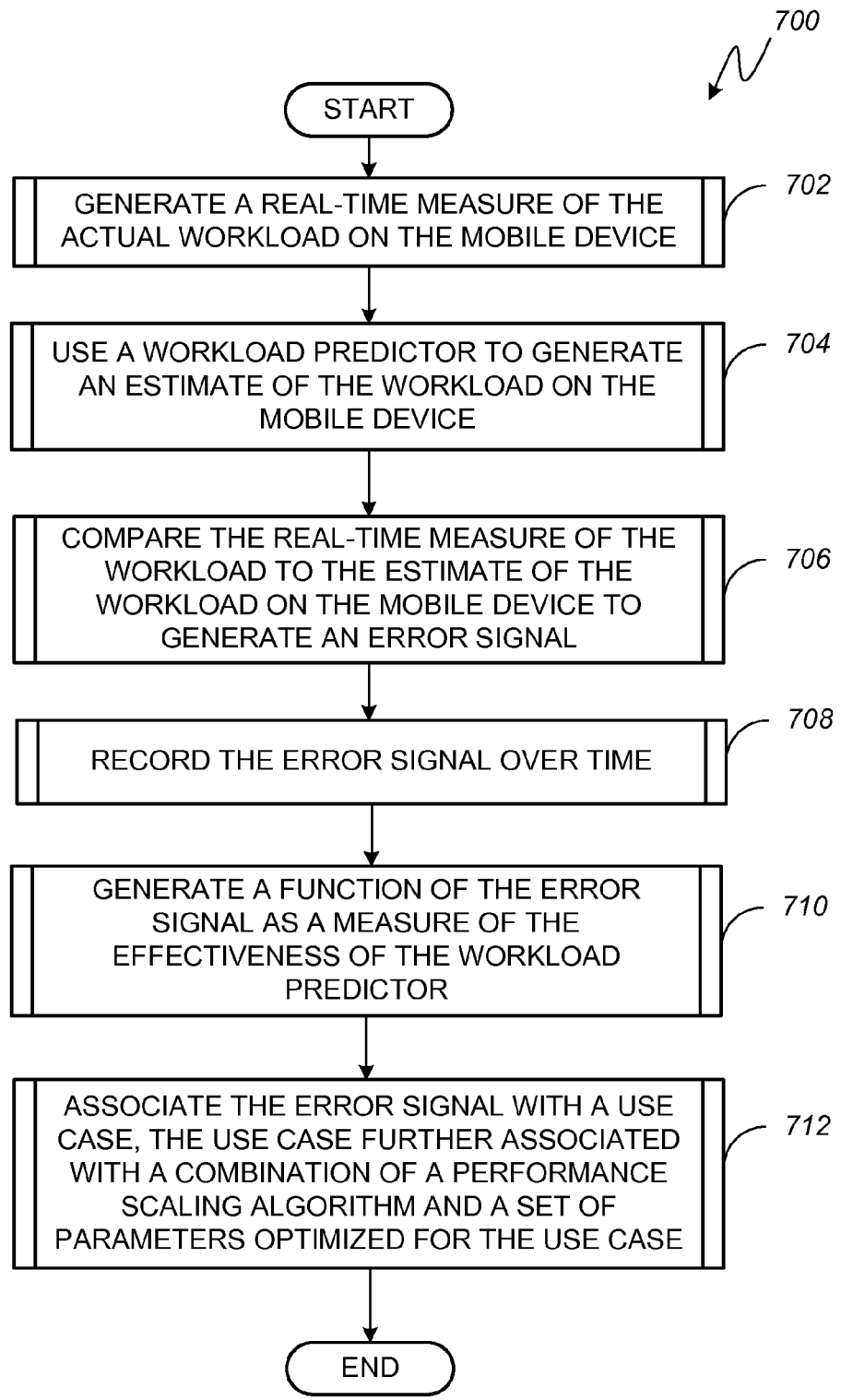
FIG. 7 is a flow diagram illustrating another alternative embodiment of a method that can be performed on the mobile device of FIG. 4.

FIG. 7 is a flow diagram illustrating an alternative embodiment of a method 700 that can be performed on the mobile device of FIG. 4. The method 700 begins with block 702 where a real-time measure of the actual workload on the mobile device 100 is generated. Such a measure may include a number of instructions processed per second, instructions processed per watt of power consumed, or any number of alternative performance measures. In block 704, the mobile device 100 uses a workload predictor to generate an estimate of the workload on the mobile device 100. Thereafter, in block 706, the mobile device 100 compares the real-time measure of the workload with the estimate of the workload to generate an error signal. In the embodiment illustrated in FIG. 4, the load manager 415 calculates the difference of the actual or measured workload and the predicted workload. As indicated in block 708, the error signal is recorded over time. Thereafter, in block 710, a function of the error signal is generated as a measure of the accuracy of the workload predictor to predict the workload on the mobile device 100. In block 712, the error signal as recorded over time is associated with a use case. When the use case has been previously associated with a combination of a performance scaling algorithm and a set of parameters optimized for the use case, the load manager 415 can controllably select and apply the performance scaling algorithm and the parameter set to adjust operation of the mobile device 100.

Figure 8:
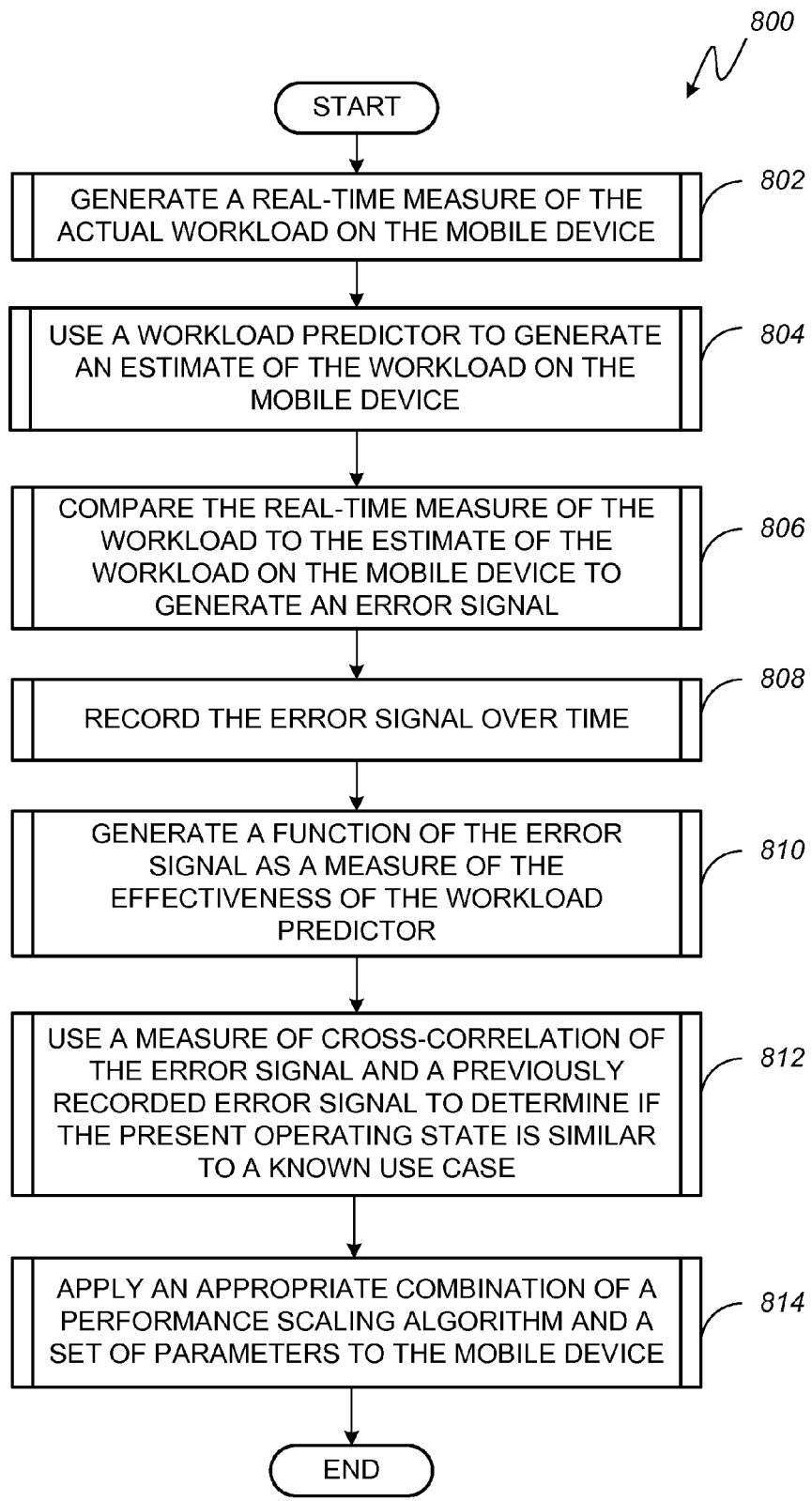
FIG. 8 is a flow diagram illustrating a method for managing a workload on the mobile device of FIG. 4.

FIG. 8 is a flow diagram illustrating a method for managing a workload on the mobile device of FIG. 4. The method 800 begins with block 802 where a real-time measure of the actual workload on the mobile device 100 is generated. Such a measure may include a number of instructions processed per second, instructions processed per watt of power consumed, or any number of alternative performance measures. In block 804, the mobile device 100 uses a workload predictor to generate an estimate of the workload on the mobile device 100. Thereafter, in block 806, the mobile device 100 compares the real-time measure of the workload with the estimate of the workload to generate an error signal. In the embodiment illustrated in FIG. 4, the load manager 415 calculates the difference of the actual or measured workload and the predicted workload.

As indicated in block 808, the error signal is recorded over time. Thereafter, in block 810, a function of the error signal is generated as a measure of the accuracy of the workload predictor to predict the workload on the mobile device 100. In block 812, a measure of cross-correlation of the real-time error signal is compared with a previously recorded error signal to determine if the present use case is similar to a known use case. When the measure of cross-correlation indicates that the error signal is similar to a known use case and the use case has been associated with an optimized combination of a performance scaling algorithm and a parameter set, the combination may be selectively applied by a suitably configured load manager 415, as indicated in block 814.

Figure 9:
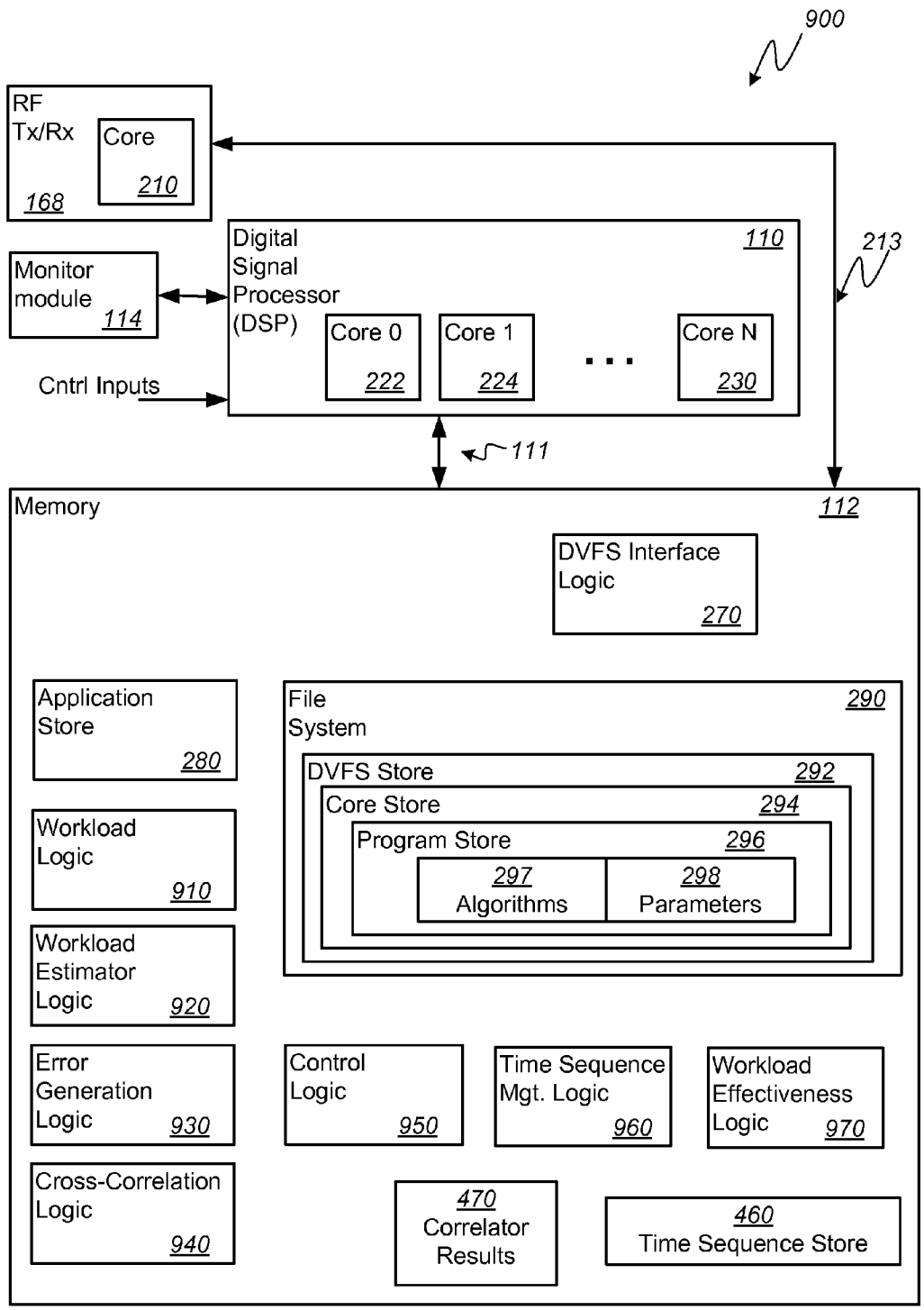
FIG. 9 is a schematic diagram illustrating an alternative embodiment of a system for measuring the effectiveness of a workload predictor operating on the mobile device of FIG. 1.

FIG. 9 is a schematic diagram illustrating an alternative embodiment of a system for measuring the effectiveness of a workload predictor operating on the mobile device 100 of FIG. 1. A computer program product may encompass the functionality described above in association with methods illustrated in FIGS. 5-8. Logic modules or collections of executable instructions suitable for storage on a computer program product or within the memory 112 on the mobile device 100 are distributed across the various logic modules shown in FIG. 9. The system 900 is generally configured in the same manner as the system 200 described above in association with FIG. 2. As indicated in FIG. 9, the system 900 includes additional software or logic modules for implementing an on-line or on-device system for quantifying the effectiveness of a workload predictor on the mobile device 100. The on-line system includes error generation logic 930 that evaluates the difference between a measured workload as provided by workload logic 910 and an estimate of the workload as determined by the workload estimator logic 920 and forwards the same to workload effectiveness logic 970 and to the time sequence store 460.

As indicated above, the control logic 950 may receive a measure of the effectiveness or accuracy of the workload predictor as determined by the workload effectiveness logic 970 and apply the same to a function or functions for determining a desired correction to an operating parameter on the mobile device. This is an example of the application of a workload predictor output that is communicated to a controller for adjusting one or more operating parameters on the mobile device 100. As described above, the workload effectiveness logic 970 may calculate a sum of the square of the magnitude of the error signal over a desired period of time. The closer the sum of the square of the magnitude of the error signal is to zero the more effective or accurate the workload predictor is at predicting the workload on the mobile device 100.

Although described as separate programs or modules, each of the workload logic 910, workload estimator logic 920, error generation logic 930, cross-correlation logic 940, control logic 950, time sequence management logic 960 and workload effectiveness logic 970 can be combined with each other and/or previously introduced logic modules stored within the memory 112 or in other data stores accessible by the digital signal processor 110.

The mobile device 100 can be configured to monitor the error term for desired lengths of time to develop a knowledge base of how the end user is actually using the device. The system 900 uses a cross-correlation technique to match error term time sequences to determine which combination of available combinations of performance scaling algorithms and parameter sets stored on the mobile device 100 is most appropriate for saving power for a present use of the device. Because the error term is a function of a predicted workload that is generated as a result of system inputs fed through the workload predictor and an actual measure of the workload on the device, the magnitude of the error term is a quantitative measure of the effectiveness of the workload predictor to predict a future workload on the device. Accordingly, as the integral of the square of the error signal over time approaches zero the more accurate the workload predictor is at predicting future use/events on the device.

For example, the workload logic 910 includes one or more executable instructions for generating a real-time measure of the workload on the mobile device 100. The measured workload will typically be associated with a select processor core of interest on the mobile device 100. However, the workload logic 910 is not limited to measuring the workload on a single processor core. Generally, the workload logic 910 functions in conjunction with the monitor module 114 via the digital signal processor 110 or with one or more sensors on the mobile device 100 to determine the present workload on the mobile device 100. As described above, the sensors may be both physical sensors that measure current, voltage, temperature, etc. or they may be enabled in software such as by monitoring the contents of a buffer or software stack.

The workload estimator logic 920 applies an algorithm to generate an estimate of the workload on the mobile device 100. The estimated workload and the measured workload are forwarded to the error generation logic 930, which generates an error signal as a function of the measured workload and the estimated workload. As illustrated in FIG. 9, one of the measured workload or the estimated workload can be digitally inverted (i.e., multiplied by −1) and added to the remaining signal. Alternatively, one of the measured workload and the estimated workload can be subtracted from the other signal to generate the error signal. Moreover, as also described above, the error signal may be squared and evaluated over a select period of time.

The time sequence management logic 960 functions in conjunction with the time sequence store 460 to record the error signal over time. When known, a present set of control inputs or other data identifying a present status of the mobile device 100 is identified and an indication of the same is associated with the stored time sequence.

The control logic 950 includes one or more executable instructions for initializing, loading, or otherwise managing the various logic modules that enable the on-line system. For example, the control logic 950 generates one or more control inputs for selectively adjusting one or more of the parameters in the parameter set 298 and/or the performance scaling algorithm 297 that is being applied to adjust the frequency and voltage of a select core processor. The control logic 950 may be responsive to inputs from the monitor module 114, the magnitude of the square of the error signal generated by the error generation logic 930 and/or the results from the cross-correlation logic 940 or results retrieved from the correlator results store 470.

The cross-correlation logic 940 includes one or more executable instructions for performing a cross-correlation analysis of two time sequences to quantitatively determine a best match between a real-time error trace and a previously stored error trace. Results from the cross-correlation logic 940 can be stored in the correlator results store 470 for later retrieval and analysis by the control logic 950 and/or the cross-correlation logic 940. In this way, the control logic 950 can store any number of indicators that characterize a present state of operation on the mobile device by evaluating the error signal. When a relatively close match is identified for the real-time error term and the relatively close match has been associated with the most effective combination of an available performance scaling algorithm and a parameter set, the control logic 950 can identify or associate the operating state as identified by the error signal with the combination. Thereafter, each time the operator of the mobile device is using the device in the same or a similar manner as identified by the error signal and perhaps one or more additional indicators, the control logic 950 can apply the most effective combination of the available performance scaling algorithm and the parameter set to conserve power on the mobile device 100. Moreover, the error signal can be generated and monitored to provide a real-time validation that the mobile device is operating in the most efficient mode available while maintaining a desired performance level.

When the logic used by the mobile device 100 is implemented in software, as is shown in FIG. 9, it should be noted that one or more of the workload logic 910, workload estimator logic 920, error generation logic 930, cross-correlation logic 940, control logic 950, the time sequence management logic 960 and the workload effectiveness logic 970 may be stored on any computer-readable medium for use by or in connection with any computer-related system or method.

In an alternative embodiment, where one or more of the workload logic 910, workload estimator logic 920, error generation logic 930, cross-correlation logic 940, control logic 950, the time sequence management logic 960 and the workload effectiveness logic 970 are implemented in hardware, the various functions may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or in parallel (substantially simultaneously) with other steps without departing from the scope and spirit of the invention. In some instances, certain steps may be omitted or not performed without departing from the invention. Further, words such as "thereafter," "then," "next," etc., are not intended to limit the order of the steps. These words are simply used to guide the reader through the description of the exemplary method.

One of ordinary skill in the art of programming is able to write computer code or identify appropriate hardware to implement the disclosed processes without undue difficulty or experimentation. Therefore, disclosure of a particular set of executable instructions or detailed hardware devices is not considered necessary for an adequate understanding of how to make and use the invention. The inventive functionality of the claimed mobile device 100 and processes is explained in more detail in the above description and in conjunction with the Figures, which may illustrate various process flows.

In one or more exemplary aspects, the functions described may be implemented in hardware, software, firmware, or any combination thereof. If implemented in software, the functions may be stored on one or more instructions or code on a computer-readable medium. Computer-readable media include computer storage media. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the scope of the present invention, as defined by the following claims.

What is claimed is:

1. A method for measuring an effectiveness of a workload predictor on a mobile device having a processor and a controller, the method comprising:
generating by the processor a real-time measure of a workload on the mobile device;
generating by the processor an estimate of the workload on the mobile device using a workload predictor;
comparing by the processor the real-time measure of the workload to the estimate of the workload on the mobile device to generate an error signal;
recording by the processor the error signal over time;
generating by the processor a function of the error signal as a measure of the effectiveness of the workload predictor;

applying by the processor the error signal to the controller, wherein the controller adjusts at least one operating parameter on the mobile device in response to the error signal; and using by the controller a measure of cross-correlation of the error signal to determine if a present operating state of the mobile device is similar to a known use case to select a previously optimized combination of a performance scaling algorithm and a parameter set associated with the known use case to manage the workload across multiple processing cores available on the mobile device.

2. The method of claim 1, wherein generating a function of the error signal comprises calculating an integral of the square of the error signal over a select period.

3. The method of claim 1, further comprising:
associating by the processor the error signal with the combination of an active performance scaling algorithm and at least one parameter.

4. The method of claim 1, further comprising:
applying by the processor a combination of a performance scaling algorithm and one or more parameters when the mobile device is so configured.

5. The method of claim 1, wherein the mobile device comprises:
one of a cellular telephone, a pager, a personal digital assistant, a reader, a satellite phone, a navigation device, or a computer with a wireless connection.

6. A load manager for execution on a mobile device, comprising:
a workload predictor configured to generate an estimate of the workload on a processor core operative on the mobile device;
a sensor configured to generate a measure of the workload on the processor core operative on the mobile device;
an error generator configured to receive the estimate of the workload and the measure of the workload and generate an error signal; and
a controller arranged to receive the error signal and adjust operation of the processor core,
wherein the controller adjusts at least one operating parameter on the mobile device in response to the error signal, and
wherein the controller uses a measure of cross-correlation of the error signal to determine if a present operating state of the mobile device is similar to a known use case to select a previously optimized combination of a performance scaling algorithm and a parameter set associated with the known use case to manage the workload across multiple processing cores available on the mobile device.

7. The load manager of claim 6, wherein the workload predictor is responsive to a performance scaling algorithm.

8. The load manager of claim 6, wherein a magnitude of a square of the error signal is used to determine an accuracy of the workload predictor to predict the workload.

9. The load manager of claim 6, further comprising:
a time sequence store responsive to the error signal.

10. The load manager of claim 9, further comprising:
a cross-correlator coupled to the time sequence store, the cross-correlator configured to generate a measure of similarity of the error signal to an error signal associated with an identified use of the mobile device.

11. A system for managing a load on a mobile device, the system comprising:

means for measuring a workload of a processor core operative on the mobile device;
means for generating an estimate of the workload of the processor core operative on the mobile device;
means for generating an error signal responsive to the workload and the estimate of the workload;
means for storing the error signal over time;
means for associating a stored error signal over time with a present state of use of the mobile device;
means for selectively adjusting at least one operating parameter on the mobile device in response to the stored error signal over time; and
means for using a measure of cross-correlation of the error signal to determine if a present operating state of the mobile device is similar to a known use case to select a previously optimized combination of a performance scaling algorithm and a parameter set associated with the known use case to manage the workload across multiple processing cores available on the mobile device.

12. The system of claim 11, wherein the means for generating an estimate of the workload comprises a workload predictor.

13. The system of claim 11, wherein the means for selectively adjusting is responsive to a cross-correlator and a detector.

14. A non-transitory computer-readable medium stored thereon processor-executable instructions configured to cause a processor of a mobile device to perform operations comprising:
generating a real-time measure of a workload on the mobile device;
generating an estimate of the workload on the mobile device;
comparing the real-time measure of the workload to the estimate of the workload on the mobile device to generate an error signal;
recording the error signal over time;
calculating a function of the error signal;
determining an effectiveness of the workload predictor in response to the function of the error signal;
applying the error signal to a mobile device controller that adjusts at least one operating parameter on the mobile device in response to the error signal; and
using a measure of cross-correlation of the error signal to determine if a present operating state of the mobile device is similar to a known use case to select a previously optimized combination of a performance scaling algorithm and a parameter set associated with the known use case to manage the workload across multiple processing cores available on the mobile device.

15. The non-transitory computer-readable medium of claim 14, wherein the stored processor-executable instructions configured to cause the processor of the mobile device to perform the operations further comprising:
associating the error signal with a combination of a performance scaling algorithm and at least one parameter.

16. The non-transitory computer-readable medium of claim 14, wherein the stored processor-executable instructions configured to cause the processor of the mobile device to perform the operations further comprising:
storing an indication of a combination of a performance scaling algorithm and one or more parameters; and
applying the combination when the mobile device is so configured.

* * * * *